(12) United States Patent
Saita et al.

(10) Patent No.: US 9,012,386 B2
(45) Date of Patent: Apr. 21, 2015

(54) GREASE COMPOSITION FOR HUB UNIT BEARING EMPLOYING AN ANGULAR CONTACT BALL BEARING AND HUB UNIT BEARING

(75) Inventors: Osamu Saita, Fujisawa (JP); Takashi Azuma, Fujisawa (JP); Masamichi Yamamoto, Fujisawa (JP)

(73) Assignee: Kyodo Yushi Co., Ltd., Kanagawa (JP)

( * ) Notice: Subject to any disclaimer, the term of this patent is extended or adjusted under 35 U.S.C. 154(b) by 0 days.

(21) Appl. No.: 13/580,217

(22) PCT Filed: Feb. 28, 2011

(86) PCT No.: PCT/JP2011/054496
§ 371 (c)(1),
(2), (4) Date: Aug. 21, 2012

(87) PCT Pub. No.: WO2011/105601
PCT Pub. Date: Sep. 1, 2011

(65) Prior Publication Data
US 2012/0314985 A1 Dec. 13, 2012

(30) Foreign Application Priority Data
Feb. 26, 2010 (JP) ................................. 2010-041597

(51) Int. Cl.
| | | |
|---|---|---|
| C10M 115/08 | (2006.01) |
| C10M 137/10 | (2006.01) |
| C10M 115/10 | (2006.01) |
| C10M 133/20 | (2006.01) |
| C10M 133/12 | (2006.01) |
| C10M 149/00 | (2006.01) |
| C10M 129/10 | (2006.01) |
| F16C 33/66 | (2006.01) |
| C10M 169/06 | (2006.01) |

(52) U.S. Cl.
CPC .......... *F16C 33/6633* (2013.01); *C10M 169/06* (2013.01); *C10M 2207/1236* (2013.01); *C10M 2207/1245* (2013.01); *C10M 2215/1026* (2013.01); *C10M 2219/044* (2013.01); *C10M 2219/068* (2013.01); *C10M 2223/045* (2013.01); *C10N 2210/01* (2013.01); *C10N 2230/02* (2013.01); *C10N 2230/06* (2013.01); *C10N 2230/72* (2013.01); *C10N 2240/02* (2013.01); *C10N 2250/10* (2013.01)

(58) Field of Classification Search
CPC . C10M 169/02; C10M 115/00; C10M 115/08
USPC ......... 508/167, 169, 174–179, 391, 393, 528; 384/544, 589, 590
See application file for complete search history.

(56) References Cited

U.S. PATENT DOCUMENTS

| | | | | |
|---|---|---|---|---|
| 5,462,684 | A | * | 10/1995 | Naka et al. ..................... 508/485 |
| 6,037,314 | A | | 3/2000 | Kondo et al. |
| 7,629,301 | B2 | | 12/2009 | Ohmura et al. |
| 2002/0013232 | A1 | * | 1/2002 | Kinoshita et al. ............. 508/364 |
| 2005/0003970 | A1 | | 1/2005 | Ohmura et al. |
| 2007/0155634 | A1 | | 7/2007 | Kubota et al. |
| 2007/0161520 | A1 | * | 7/2007 | Kawamura .................... 508/390 |
| 2007/0173420 | A1 | | 7/2007 | Iso |
| 2008/0234150 | A1 | * | 9/2008 | Kakizaki et al. .............. 508/168 |
| 2009/0003742 | A1 | * | 1/2009 | Nakatani et al. .............. 384/289 |
| 2009/0136172 | A1 | | 5/2009 | Egami et al. |
| 2010/0035776 | A1 | | 2/2010 | Ozaki et al. |
| 2010/0093567 | A1 | * | 4/2010 | Endo et al. ..................... 508/100 |
| 2011/0086785 | A1 | | 4/2011 | Kubota et al. |

FOREIGN PATENT DOCUMENTS

| | | | |
|---|---|---|---|
| CN | 1806032 | | 7/2006 |
| CN | 1922295 | | 2/2007 |
| CN | 101528898 | | 9/2009 |
| EP | 2264132 | | 12/2010 |
| JP | 49-71357 | | 7/1974 |
| JP | 9-324190 | | 12/1997 |
| JP | 10-183162 | | 7/1998 |
| JP | 2006-077056 | | 3/2006 |
| JP | 2006-342261 | | 12/2006 |
| JP | 2008-088386 | | 4/2008 |
| JP | 2008-111057 | | 5/2008 |
| JP | 2008-286230 | | 11/2008 |
| KR | 10-2009-0039237 | | 4/2009 |
| KR | 2009039237 A | * | 4/2009 |
| KR | 10-2009-0106659 | | 10/2009 |
| WO | WO 2008117478 A1 | * | 10/2008 |
| WO | WO 2009/104790 | | 8/2009 |

OTHER PUBLICATIONS

International Search Report for PCT/JP2011/054496 mailed May 31, 2011.
Written Opinion of the International Searching Authority mailed May 31, 2011.
Chinese Office Action issued for corresponding Chinese Patent Application No. 201180011017.1, dated Mar. 26, 2013.
Korean Office Action issued for Korean Patent Application No. 10-2012-7024505 dated Jun. 20, 2013 (with partial English Translation).

\* cited by examiner

*Primary Examiner* — Pamela H Weiss
(74) *Attorney, Agent, or Firm* — Nixon & Vanderhye P.C.

(57) ABSTRACT

The invention provides a grease composition for a hub unit bearing employing an angular contact ball bearing, containing (a) as a thickener a mixture of diurea compounds represented by formula (I): $R^1$—NHCONH—$R^2$—NHCONH—$R^1$, formula (II): $R^1$—NHCONH—$R^2$—NHCONH—$R^3$, and formula (III): $R^3$—NHCONH—$R^2$—NHCONH—$R^3$ wherein $R^1$ is cyclohexyl group, $R^2$ is a divalent aromatic hydrocarbon group having 6 to 15 carbon atoms, $R^3$ is a straight-chain or branched alkyl group having 12 to 20 carbon atoms, and $(R^1/(R^1+R^3))\times100$=85 to 95 mol %; (b) a base oil; (c) a molybdenum dialkyldithiocarbamate; and (d) a calcium sulfonate. The grease composition of the invention, when used in the hub unit bearing, shows minimum leakage, excellent anti-flaking properties and satisfactory bearing lubrication life.

7 Claims, No Drawings

GREASE COMPOSITION FOR HUB UNIT BEARING EMPLOYING AN ANGULAR CONTACT BALL BEARING AND HUB UNIT BEARING

This application is the U.S. national phase of International Application No. PCT/JP2011/054496 filed 28 Feb. 2011 which designated the U.S. and claims priority to JP 2010-041597 filed 26 Feb. 2010, the entire contents of each which are hereby incorporated by reference.

TECHNICAL FIELD

The present invention relates to a grease composition for a hub unit bearing where an angular contact ball bearing is used, and a hub unit bearing characterized by being filled with the above-mentioned grease composition.

BACKGROUND ART

Various kinds of grease compositions have already been reported for hub unit bearings. For example, JP 2006-077056A discloses that a grease composition comprising a particular urea compound and an organic molybdenum compound can significantly extend the flaking life and the lubrication life and also reduce the fretting problem. JP 2008-088386 A discloses that a grease composition comprising an aromatic diurea compound as a thickener, three kinds of rust inhibitors, i.e., a carboxylic acid based rust inhibitor, a carboxylate based rust inhibitor and an amine based rust inhibitor, and an organic zinc compound or sulfur-phosphorus based compound as an antiwear agent is excellent in anti-flaking properties, resistance to wear, anti-fretting properties, and anti-corrosion performance. JP 2008-111057 A discloses that a grease composition comprising an aromatic diurea as a thickener and at least one compound selected from organic molybdenum compounds and organic zinc compounds has an inhibitory effect on corrosion induced by the presence of water and flaking phenomenon resulting from hydrogen produced from water.

On the other hand, a grease composition for constant velocity joints, comprising a base oil, a urea based thickener, a molybdenum dithiocarbamate and/or molybdenum dithiophosphate, and a calcium salt such as calcium petroleum sulfonate or the like is known for its efficient lubricating performance for the constant velocity joints, its effective reduction of friction, its regulating effect on vibration and the like (JP 09-324190 A).

As a grease composition for constant velocity joints, a grease composition comprising a base oil, a thickener and a metallic salt such as a metallic salt of oxidized wax is also known to be remarkably compatible with a silicone rubber-made boot (JP 10-183162 A).

SUMMARY OF INVENTION

Technical Problem

Any conventional grease compositions for the hub unit bearing were designed to aim at having good anti-flaking properties and satisfactory bearing lubrication life. Those grease compositions cannot meet the requirements for minimum leakage of grease from the hub unit bearing.

Leakage of the grease depends on the initial hardness of the employed grease, i.e., the so-called penetration, and the degree to what the grease becomes soft under the application of heat or shear force while in use, in other words, the shear stability of grease which varies according to the kind of thickener. The grease which may leak from the hub unit bearing will shorten the life, and in the worst case, lead to a failure of braking operation if the leaking grease or oil attains to the breaking unit.

The flaking life is determined by metal fatigue. In order to live out a natural flaking life, it has been regarded as the sole means to thicken a lubricating oil film. Thus, the conventional greases used for lubrication of a part to be lubricated have been just required to form a sufficiently thick oil film, in other words, to employ a base oil with a sufficiently high viscosity. However, higher viscosity will consequently increase the torque of the bearing. The increase in torque of the hub unit bearing directly leads to fuel inefficiency of cars, which is contrary to the recent trend to economic cars and low fuel consumption.

The grease-filled part is enclosed with a boot in the constant velocity joint, unlike in the bearing. In the constant velocity joint, therefore, there is no need to worry about the leakage of grease to the outside as far as the boot might not be damaged. In light of the above, one of the important requirements of the grease composition for the constant velocity joint is compatibility with the boot material (including rubber materials and resin materials). In the hub unit bearing, however, the softened or fluidized grease or the separated oil may leak out although a contact type seal is attached. Accordingly, the conventional grease compositions for the constant velocity joint cannot satisfy the requirement of minimum leakage when used in the hub unit bearing.

In particular, the angular contact ball bearing has a contact angle between the ball and the raceways, so that the spinning movement occurs at the contact portion between the ball and the raceways, which causes sliding. Under application of a thrust load, the deep groove ball bearing produces a contact angle, whereby the spinning movement causes sliding. Since the contact angle is larger in the angular contact ball bearing, the sliding caused by the spinning movement becomes larger than in the deep groove ball bearing. Consequently, the contact portion between the ball and the raceways readily produces the problem of seizing when a lubricant is lacking, thereby attending to the end of the bearing lubrication life. To extend the bearing lubrication life of the angular contact ball bearing, the grease flowability that allows grease or base oil to continuously flow into the portion to be lubricated (i.e., the contact portion between the ball and the raceways) becomes an important performance, not to mention the heat resistance of grease. Such a grease flowability is more severely demanded in the angular contact ball bearing than in the deep groove ball bearing.

Accordingly, an object of the invention is to provide a grease composition for a hub unit bearing employing an angular contact ball bearing, with a minimum grease leakage, and capable of exhibiting good anti-flaking properties and a satisfactory bearing lubrication life.

Solution to Problem

The invention provides the following composition:

(1) A grease composition for a hub unit bearing employing an angular contact ball bearing, comprising the following components (a) to (d):

(a) as a thickener a mixture of diurea compounds represented by formulas (I) to (III):

$$R^1\text{—NHCONH—}R^2\text{—NHCONH—}R^1 \quad\quad (I)$$

$$R^1\text{—NHCONH—}R^2\text{—NHCONH—}R^3 \quad\quad (II)$$

$$R^3\text{—NHCONH—}R^2\text{—NHCONH—}R^3 \quad\quad (III)$$

wherein $R^1$ is cyclohexyl group, $R^2$ is a divalent aromatic hydrocarbon group having 6 to 15 carbon atoms, and $R^3$ is a straight-chain or branched alkyl group having 12 to 20 carbon atoms;

the molar ratio of the cyclohexyl groups with respect to the total number of moles of the cyclohexyl groups and the straight-chain or branched alkyl groups having 12 to 20 carbon atoms being 85 to 95% in the thickener;

(b) a base oil;
(c) a molybdenum dialkyldithiocarbamate; and
(d) a calcium sulfonate.

(2) The grease composition for the hub unit bearing employing an angular contact ball bearing as described in the above-mentioned item (1), wherein the molybdenum dialkyldithiocarbamate (c) is contained in an amount of 1 to 5 mass % based on the total mass of the composition.

(3) The grease composition for the hub unit bearing employing an angular contact ball bearing as described in the above-mentioned item (1) or (2), wherein the calcium sulfonate (d) is contained in an amount of 1 to 5 mass % based on the total mass of the composition.

(4) The grease composition for the hub unit bearing employing an angular contact ball bearing as described in any one of the above-mentioned items (1) to (3), further comprising a zinc dialkyldithiophosphate in an amount of 0.1 to 3.0 mass % based on the total mass of the composition.

(5) A hub unit bearing employing an angular contact ball bearing, characterized by having the grease composition as described in any one of the above-mentioned items (1) to (4) enclosed therein.

Effects of Invention

The grease composition according to the invention can be provided with a sufficient resistance to grease leakage, anti-flaking property, and a satisfactory bearing lubrication life when used for a hub unit bearing employing an angular contact ball bearing. Particularly, the invention can prevent the flaking due to metal fatigue which results from thinned oil film to extend the flaking life, without trying to thicken the oil film.

DESCRIPTION OF EMBODIMENTS (a) Thickener

As previously mentioned, the kind of thickener may contribute to leakage of grease. Unlike the grease for constant velocity joints, the grease composition for bearings is required to have a resistance to grease leakage as one of the significantly important properties. Therefore, it is necessary to choose an optimal thickener in consideration of other performance also to be satisfied.

The so-called aliphatic diurea based grease composition containing the thickener of formulas (I) to (III) wherein both of the end groups represented by $R^1$ and $R^3$ are aliphatic hydrocarbon groups is not suitable for the hub unit bearing because the resultant grease tends to easily leak out. The grease composition containing as the thickener an aromatic diurea compound of formulas (I) to (III) wherein both of the end groups represented by $R^1$ and $R^3$ are aromatic hydrocarbon groups has good heat resistance, but a satisfactory bearing lubrication life cannot be obtained in the angular contact ball bearing because of the poor flowability.

On the other hand, the heat resistance of the grease composition containing a metallic soap thickener such as lithium soap or the like is not enough for the application of hub unit bearing. The softened grease tends to leak out under the circumstances of high temperatures. As a result, a satisfactory bearing lubrication life cannot be obtained when the grease is used in the angular contact ball bearing. When compared with the lithium soap, lithium complex soap shows higher heat resistance, and therefore a satisfactory bearing lubrication life for the angular contact ball bearing can be obtained in the hub unit bearing. However, when the lithium soap and lithium complex soap are used for the grease composition, the anti-flaking properties of the resultant grease composition are inferior to those of the urea based grease composition, so that the flaking life is not enough for the application of hub unit bearing.

The thickener used in the invention is a mixture of particular diurea compounds represented by the above-mentioned formulas (I) to (III), and the molar ratio of cyclohexyl groups represented by $R^1$ with respect to the total number of moles of the cyclohexyl groups of $R^1$ and the straight-chain or branched alkyl groups having 12 to 22 carbon atoms represented by $R^3$ is 85 to 95%, preferably 85 to 90% in the resultant thickener of formulas (I) to (III). When the above molar ratio exceeds 95%, the grease flowability is not enough to produce a satisfactory bearing lubrication life for the angular contact ball bearing. When the molar ratio is less than 85%, the grease leakage may occur in the same way as in the case of the aliphatic diurea based grease compositions.

In the formulas (I) to (III), $R^2$ is a divalent aromatic hydrocarbon group having 6 to 15 carbon atoms, preferably —$C_6H_4$—$CH_2$—$C_6H_4$—, —$C_6H_4$— or —$C_6H_3(CH_3)$—, and more preferably —$C_6H_4$—$CH_2$—$C_6H_4$—. $R^3$ is a straight-chain or branched alkyl group having 8 to 20 carbon atoms, preferably a straight-chain alkyl group having 8 to 20 carbon atoms.

In particular, a mixture of the diurea compounds represented by formulas (I) to (III) wherein $R^1$ is a straight-chain or branched alkyl group having 18 carbon atoms, $R^2$ is —$C_6H_4$—$CH_2$—$C_6H_4$—, and $R^3$ is cyclohexyl group is preferably used in the invention.

A mixture of the diurea based thickener compounds according to the invention can be obtained by a reaction of an alkylmonoamine such as octylamine, decylamine, dodecylamine, hexadecylamine, octadecylamine or the like; cyclohexylamine; and a diisocyanate such as diphenylmethane-4,4'-diisocyanate, phenylenediisocyanate, tolylenediisocyanate or the like.

The urea based thickener compounds may preferably be contained in an amount of 3 to 20 mass %, more preferably 9 to 15 mass %, based on the total mass of the grease composition of the invention.

(b) Base Oil

For the base oil used in the invention, mineral oils and any synthetic oils may be used in combination when necessary. Preferably, the mineral oil may be contained in an amount of 50 mass % or more of the total mass of the base oil, and more preferably, 50 mass % or more of the mineral oil may be used in combination with a synthetic hydrocarbon oil. When the content of the mineral oil is less than 50 mass % of the total mass of the base oil, in other words, the content of the synthetic oil is 50 mass % or more, the raw material cost becomes extremely high, which makes it difficult to use the resultant grease composition for the hub unit bearing.

As the synthetic oils, ester type synthetic oils including diesters and polyol esters; synthetic hydrocarbon oils including poly α-olefin and polybutene; ether type oils including alkyldiphenyl ethers and polypropylene glycols; silicone oils; fluorinated oils and the like can be used. Those synthetic oils can be used alone or in combination when added to the mineral oil.

In consideration of the operation in a cold district of −40° C. or less, the hub unit bearing is required to have good starting performance at the low temperatures. When the synthetic oil is mixed into the base oil to further improve the starting performance at low temperatures, the ester type synthetic oil is unfavorable because the seal used for the hub unit bearing may be swollen. The ether type synthetic oil, silicone oil and fluorinated oil are also unsuitable because they are considerably expensive. Then, the synthetic hydrocarbon oil is preferable as the synthetic oil used for mixing with the mineral oil.

The base oil used in the invention may preferably have a kinetic viscosity of 70 to 400 mm²/s at 40° C. When the kinetic viscosity at 40° C. is less than 70 mm²/s, a satisfactory flaking life cannot be obtained for the hub unit bearing. When the kinetic viscosity at 40° C. exceeds 400 mm²/s, the torque of the bearing is apt to increase.

As the bearing for a main shaft of machine tool which is rotated at extremely high speeds, the angular contact ball bearing is employed in most cases. In order to obtain a satisfactory flaking life, the kinetic viscosity of the base oil for the grease composition for the hub unit bearing where a sufficient oil film thickness is needed is chosen in a quite different manner from the case of the grease for the main shaft bearing of machine tool. For the main shaft bearing of machine tool, the base oil for grease is generally designed to have a kinetic viscosity of 15 to 40 mm²/s at 40° C., at most 30 to 60 mm²/s at 40° C. so that the resistance to a shear force applied to the grease at high speeds may be reduced.

(c) Molybdenum Dialkyldithiocarbamate

The component (C) used in the invention, that is, molybdenum dialkyldithiocarbamate may preferably be represented by the following formula:

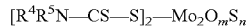

wherein $R^4$ and $R^5$ are each a straight-chain or branched alkyl group having 1 to 24 carbon atoms, preferably 3 to 18 carbon atoms, and m is 0 to 3 and n is 4 to 1, provided that m+n=4.

The content of the molybdenum dialkyldithiocarbamate (c) may preferably be 1 to 5 mass %, more preferably 1 to 4 mass %, based on the total mass of the composition. The content of less than 1 mass % is too small to obtain the desired effects satisfactorily. And when the content exceeds 5.0 mass %, more effects may not be recognized even though the content increases.

(d) Calcium Sulfonate

The component (d) used in the invention, i.e., calcium sulfonate is a calcium salt of sulfonic acid having an organic lipophilic group. For such an organic sulfonate, petroleum sulfonic acid obtainable by sulfonation of an aromatic hydrocarbon ingredient contained in the lubricating oil fraction, synthetic sulfonic acid such as dinonylnaphthalene sulfonic acid, heavy alkylbenzenesulfonic acid or the like can be used. More preferably, calcium salts of dinonylnaphthalenesulfonic acid and calcium salts of alkylbenzenesulfonic acid may be used. In particular, neutral dinonylnaphthalenesulfonic acid calcium salt and neutral alkylbenzenesulfonic acid calcium salt where the alkyl group has 16 to 24 carbon atoms are preferred.

The content of the calcium sulfonate (d) may preferably be 1 to 5 mass %, more preferably 1 to 4 mass %, based on the total mass of the composition. The content of less than 1 mass % is too small to obtain the desired effects satisfactorily. And when the content exceeds 5.0 mass %, more effects may not be recognized even though the content increases.

(e) Zinc Dithiophosphate

The component (e) optionally used in the invention, i.e., zinc dithiophosphate may preferably be represented by the following formula:

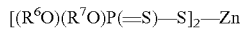

wherein $R^6$ and $R^7$ are each a straight-chain or branched alkyl group having 3 to 12 carbon atoms, preferably 3 to 6 carbon atoms.

The content of the zinc dithiophosphate (e) may preferably be 0.1 to 3.0 mass %, more preferably 0.5 to 3.0 mass %, based on the total mass of the composition. The content of less than 0.1 mass % is too small to obtain the desired effects satisfactorily. And when the content exceeds 3.0 mass %, more effects may not be recognized even though the content increases.

When necessary, the grease composition of the invention may further comprise other general-purpose additives. For example, the following additives may be used:

—Antioxidant

Amines: phenyl α-naphthylamine, alkylated phenyl α-naphthylamine, alkylated diphenylamine and the like.

Phenols: hindered phenols such as 2,6-di-tert-butyl-p-cresol, pentaerythrityl tetrakis [3-(3,5-di-t-butyl-4-hydroxyphenyl)propionate], octadecyl-3-(3,5-di-t-butyl-4-hydroxyphenyl)propionate and the like.

Quinolines: 2,2,4-trimethyl-1,2-dihydroquinoline polymer and the like.

—Rust Preventive

Carboxylic acids and derivatives thereof; alkenylsuccinic anhydride, alkenylsuccinate, half ester of alkenylsuccinate.

Carboxylates; amine salts of fatty acids, dibasic acids, naphthenic acids, lanolin fatty acids, alkenylsuccinic acids and the like.

Sulfonates; Ba, Zn, Na salt or the like of sulfonic acid.

Passivators; sodium nitrite, sodium molybdate and the like.

Esters; sorbitan trioleate, sorbitan monooleate and the like.

Metal corrosion inhibitors; benzotriazole or derivatives thereof, zinc oxide and the like.

—Extreme Pressure Agent

Phosphorus-containing compounds; tricresyl phosphate, tri-2-ethylhexyl phosphate and the like Sulfur-containing compounds; dibenzyl disulfide, a variety of polysulfides and the like.

Sulfur-phosphorus containing compounds; triphenyl phosphorothionate

Organic metal-based extreme pressure agents; Mo, Sb, Bi salt or the like of dialkyl dithiophosphate, Zn, Sb, Ni, Cu, Bi salt or the like of dialkyl dithiocarbamate, and the like.

Others, e.g., ashless dithiocarbamate, ashless dithiophosphate carbamate and the like.

—Solid Lubricant: Molybdenum Disulfide, Graphite, PTFE, MCA and the Like.

The penetration of the grease composition of the invention may preferably be in the range of 265 to 325, more preferably 270 to 310. The penetration of less than 265 will increase the torque, which may unfavorably induce poor fuel efficiency of cars. When the penetration exceeds 325, the grease shows insufficient adherence, so that lack of grease around the portion to be lubricated causes poor lubrication.

EXAMPLES

Examples 1 to 4 and Comparative Examples 1 to 9

The predetermined amounts of raw material isocyanate and amine(s) were allowed to react at a molar ratio of 1 to 2 in the base oil. After given amounts of additives were added, the resultant mixture was adjusted to have a penetration of 300 using a three-roll mill. The kinetic viscosity of the base oil at 40° C. was determined according to the JIS K 2283. The same procedures applied to the following examples.

Comparative Example 10

In a predetermined amount of base oil, a predetermined amount of lithium hydroxystearate was dissolved with stirring under application of heat. After cooling the mixture, given amounts of additives were added, and the resultant mixture was adjusted to have a penetration of 300 using a three-roll mill Comparative Example 11

To a predetermined amount of base oil, a predetermined amount of hydroxystearic acid was added. Then, lithium hydroxide monohydrate in a predetermined amount was added and saponified so that the molar ratio of the hydroxystearic acid to the lithium hydroxide monohydrate was 1:1. Subsequently, azelaic acid in a predetermined amount was further added and saponified so that the molar ratio of the lithium hydroxide monohydrate to the azelaic acid was 1:1. The resultant mixture was heated to 200° C., followed by cooling. After given amounts of additives were added and mixed, the resultant mixture was adjusted to have a penetration of 300 using a three-roll mill.
[Evaluation Test Methods]
<Bearing Lubrication Life Test>

A bearing 7206B was filled with each test grease composition (4 ml). The bearing was operated in such a manner that the inner ring was rotated at 6000 rpm under the application of an axial load (Fa) of 1500 N, with the temperature of the outer ring of the bearing being maintained at 150° C. A cycle of 20-hours operation and the subsequent 4-hours suspension was repeated, and the bearing lubrication life was expressed as hours until the rotational torque of bearing became excessively large to cause overcurrent (3.5 ampere) or the bearing temperature increased by over 10° C.
(Criteria) Bearing lubrication life (hour)
   o: 1000 h< The bearing lubrication life was remarkably long, and the grease was regarded as suitable for hub unit bearing.
   Δ: 500 to 1000 h The bearing lubrication life was long, and the grease was regarded as suitable for hub unit bearing.
   x: 500 h> The bearing lubrication life was short, and the grease was regarded as unsuitable for hub unit bearing.
<Flaking Life Test>

Three steel balls with a diameter of 15 mm were placed in a 10.95-mm-deep cylindrical container having an inner diameter of 36.0 mm of the bottom surface and an inner diameter of 31.63 mm of the top end, and coated with 20 g of each test grease composition. One 5/8 inch (15.9 mm) diameter steel ball was set on the above-mentioned three steel balls so as to come in contact therewith, and then rotated at a predetermined number of revolutions. With the rotation of the upper steel ball, the lower three steel balls revolved around the upper steel ball as rotating on their respective axes. The upper steel ball was continuously rotated until flaking was found on any of the steel balls. In this case, the flaking occurred at a contact portion between the balls where the highest contact pressure was applied. The flaking life was expressed as the total number of rotations when the flaking first occurred.
(Test Conditions)
Steel balls used in the test: 5/8 inch-diameter steel ball for bearing (rotating ball), 15 mm-diameter steel balls for bearing (driven balls)
Load (W): 400 kgf (6.5 Gpa)[1)]
Revolutions per minute (n): 1500 rpm
Repeated numbers of test: 5 (Average life: average value obtained when n=5)
   1) Maximum Hertzian pressure applied between the steel balls. The value of 6.5 Gpa means a considerably high contact pressure and shows that the oil film becomes rather thin.
(Criteria) Average life (×1000 rotations)
   oo: (10,000 or more)×1000 rotations The flaking life was remarkably long.
   o: (5000–10,000)×1000 rotations The flaking life was long.
   Δ: (2000–5000)×1000 rotations The flaking life was not regarded as long.
   x: (2,000 or less)×1000 rotations The flaking life was short.
<Grease Leakage Resistance Test>

The bearing 6204ZZ was filled with each test grease composition (1.8 g). The bearing was operated for one hour at 10,000 rpm and 150° C. with an axial load (Fa) and a radial load (Fr) of 67 N. A decrease in grease after the test operation was determined to calculate the leakage amount as a unit of mass %.
(Criteria) Grease leakage amount (mass %)
   o: 5 mass %>A slight grease leakage was observed, but the leakage was not noticeable. There was no problem.
   Δ: 5 to 10 mass % A leakage of grease was found. There were concerns about shortening of the life and failure of the breaking operation.
   x: 10 mass %<A noticeable grease leakage was found. The concerns about shortening of the life and failure of the breaking operation were serious.
[Test Results]

It was found that all the urea based greases having excellent heat resistance did not always show a long life in the test to evaluate the bearing lubrication life of the angular contact ball bearing. The grease compositions which showed a long life in the bearing lubrication life test using the angular contact ball bearing were limited to the lithium complex grease composition having both a good heat resistance and a good flowability, the grease compositions according to the invention (containing the thickener compounds represented by general formulas (I) to (III)), and the grease compositions containing as the thickener particular urea compounds, i.e., aliphatic diurea compounds.

The flaking life of the urea based greases was satisfactory, while that of the lithium complex grease was not satisfactory.

When the grease is applied to the hub unit bearing, a sufficiently long flaking life is needed. Therefore, a sufficiently high kinetic viscosity of base oil becomes necessary to obtain an ample oil film thickness. In the invention, however, it was possible to prevent the flaking due to metal fatigue to extend the flaking life by the addition of the molybdenum dialkyldithiocarbamate (c) and the calcium sulfonate (d), not by thickening the oil film.

Moreover, addition of the zinc dialkyldithiophosphate (e) was found to further extend the flaking life.

When the grease comprising the aromatic diurea and the grease comprising a mixture of the diurea compounds of formulas (I) to (III) where the number of moles of the cyclohexyl groups was over 95% were used, the flowability was not enough to achieve a satisfactory bearing lubrication life for the angular contact ball bearing although the leakage of grease was reduced. On the other hand, the grease comprising the aliphatic diurea and the grease comprising a mixture of the diurea compounds of formulas (I) to (III) where the number of moles of the cyclohexyl groups was less than 85% showed conspicuous grease leakage.

TABLE 1

|  |  | Example 1 | Example 2 | Example 3 | Example 4 |
|---|---|---|---|---|---|
| Thickener (Raw materials for urea) | Isocyanate | MDI*1 | MDI*1 | MDI*1 | MDI*1 |
|  | Amines (molar ratio) | Octadecylamine (13) Cyclohexylamine (87) | Octadecylamine (13) Cyclohexylamine (87) | Octadecylamine (13) Cyclohexylamine (87) | Octadecylamine (13) Cyclohexylamine (87) |
| Content of thickener (mass %) |  | 11.0 | 11.0 | 11.0 | 11.0 |
| Base oil (mixing ratio by mass) |  | Mineral oil (100) | Mineral oil (100) | Mineral oil (60) PAO*2 (40) | Mineral oil (100) |
| Content of base oil (mass %) |  | 85.0 | 84.0 | 84.0 | 84.0 |
| Kinetic viscosity of base oil (40° C.) (mm2/s) |  | 100 | 100 | 100 | 200 |
| Additives (mass % based on total mass of grease) | MoDTC*3 | 2.0 | 2.0 | 2.0 | 2.0 |
|  | Ca sulfonate*4 | 2.0 | 2.0 | 2.0 | 2.0 |
|  | ZnDTP(1)*5 | 0.0 | 1.0 | 1.0 | 1.0 |
| Worked penetration |  | 300 | 300 | 300 | 300 |
| Flaking resistance |  | ○ | ○○ | ○○ | ○○ |
| Bearing lubrication life |  | ○ | ○ | ○ | ○ |
| leakage resistance |  | ○ | ○ | ○ | ○ |
|  |  | Comp. Example 1 | Comp. Example 2 | Comp. Example 3 | Comp. Example 4 |
| Thickener (Raw materials for urea) | Isocyanate | MDI*1 | MDI*1 | MDI*1 | MDI*1 |
|  | Amine(s) (molar ratio) | p-toluidine | Octadecylamine | Octylamine | Cyclohexylamine |
| Content of thickener (mass %) |  | 18.0 | 18.0 | 8.0 | 18.0 |
| Base oil (mixing ratio by mass) |  | Mineral oil (100) | Mineral oil (100) | Mineral oil (100) | Mineral oil (100) |
| Content of base oil (mass %) |  | 77.0 | 77.0 | 87.0 | 77.0 |
| Kinetic viscosity of base oil (40° C.) (mm2/s) |  | 100 | 100 | 100 | 100 |
| Additives (mass % based on total mass of grease) | MoDTC*3 | 2.0 | 2.0 | 2.0 | 2.0 |
|  | Ca sulfonate*4 | 2.0 | 2.0 | 2.0 | 2.0 |
|  | ZnDTP(1)*5 | 1.0 | 1.0 | 1.0 | 1.0 |
| Worked penetration |  | 300 | 300 | 300 | 300 |
| Flaking resistance |  | ○ | ○ | ○ | ○ |
| Bearing lubrication life |  | x | ○ | ○ | x |
| leakage resistance |  | ○ | x | x | ○ |
|  |  | Comp. Example 5 | Comp. Example 6 |  |  |
| Thickener (Raw materials for urea) | Isocyanate | MDI*1 | MDI*1 |  |  |
|  | Amines (molar ratio) | p-toluidine (50) Cyclohexylamine (50) | Octadecylamine (50) Cyclohexylamine (50) |  |  |
| Content of thickener (mass %) |  | 18.0 | 7.0 |  |  |
| Base oil (mixing ratio by mass) |  | Mineral oil (100) | Mineral oil (100) |  |  |
| Content of base oil (mass %) |  | 77.0 | 88.0 |  |  |
| Kinetic viscosity of base oil (40° C.) (mm2/s) |  | 100 | 100 |  |  |
| Additives (mass % based on total mass of grease) | MoDTC*3 | 2.0 | 2.0 |  |  |
|  | Ca sulfonate*4 | 2.0 | 2.0 |  |  |
|  | ZnDTP(1)*5 ZnDTP(2)*6 | 1.0 | 1.0 |  |  |
| Worked penetration |  | 300 | 300 |  |  |
| Flaking resistance |  | ○ | ○○ |  |  |
| Bearing lubrication life |  | x | ○ |  |  |
| leakage resistance |  | ○ | x |  |  |

TABLE 2

|  |  | Comp. Example 7 | Comp. Example 8 | Comp. Example 9 | Comp. Example 10 | Comp. Example 11 |
|---|---|---|---|---|---|---|
| Thickener (Raw materials for urea) | Isocyanate | MDI*1 | MDI*1 | MDI*1 | — | — |
|  | Amines (molar ratio) | Octadecylamine (20) Cyclohexylamine (80) | Octadecylamine (13) Cyclohexylamine (87) | Octadecylamine (13) Cyclohexylamine (87) | — | — |
| Thickener |  | — | — | — | Lithium soap | Lithium complex |
| Content of thickener (mass %) |  | 7.3 | 11.0 | 11.0 | 8.0 | 10.0 |
| Base oil (mixing ratio by mass) |  | Mineral oil (100) | Mineral oil (100) | Mineral oil (100) | Mineral oil (100) | Mineral oil (100) |
| Content of base oil (mass %) |  | 84.2 | 86.0 | 86.0 | 87.0 | 85.0 |
| Kinetic viscosity of base oil (40° C.) (mm2/s) |  | 91.4 | 100 | 100 | 100 | 100 |
| Additives (mass % based on | MoDTC*3 | 3.0 | 0.0 | 2.0 | 2.0 | 2.0 |
|  | Ca sulfonate*4 | 5.0 | 2.0 | 0.0 | 2.0 | 2.0 |

TABLE 2-continued

|  |  | Comp. Example 7 | Comp. Example 8 | Comp. Example 9 | Comp. Example 10 | Comp. Example 11 |
|---|---|---|---|---|---|---|
| total mass of grease) | ZnDTP(1)*5 | 0.0 | 1.0 | 1.0 | 1.0 | 1.0 |
|  | ZnDTP(2)*6 | 0.5 | 0.0 | 0.0 | — | — |
| Worked penetration | | 325 | 300 | 300 | 300 | 300 |
| Flaking resistance | | ○○ | x | x | x | x |
| Bearing lubrication life | | ○ | ○ | ○ | x | ○ |
| leakage resistance | | x | ○ | ○ | Δ | Δ |

*1Diphenylmethane-4,4'-diisocyanate
*2Poly α-olefin
*3Molybdenum dithiocarbamate (MOLYVAN A (trade name) made by R.T. Vanderbilt Company, Inc.)
*4Calcium dinonylnaphthalenesulfonate (NA-SUL 729 (trade name) made by King Industries, Inc.)
*5Zinc dithiophosphate (TLA-111 (trade name) made by Texaco Additive Company)
*6Zinc dithiophosphate (Lubrizol 1360 (trade name) made by The Lubrizol Corporation)

The invention claimed:

1. A grease composition for a hub unit bearing employing an angular contact ball bearing, comprising:
   (a) as a thickener a mixture of diurea compounds represented by formulas (I), (II) and (III):

$$R^1—NHCONH—R^2—NHCONH—R^1 \quad (I)$$

$$R^1—NHCONH—R^2—NHCONH—R^3 \quad (II)$$

$$R^3—NHCONH—R^2—NHCONH—R^3 \quad (III)$$

wherein $R^1$ is cyclohexyl group, $R^2$ is $—C_6H_4—CH_2—C_6H_4$, and $R^3$ is a straight-chain or branched alkyl group having 18 carbon atoms;
   the molar ratio of the cyclohexyl groups with respect to the total number of moles of the cyclohexyl groups and straight-chain or branched alkyl groups having 18 carbon atoms being 85 to 95 % in the thickener;
   (b) a base oil selected from the group consisting of a mineral oil, a synthetic hydrocarbon oil and a mixture thereof;
   (c) a molybdenum dialkyldithiocarbamate;
   (d) a calcium sulfonate; and
   (e) an antioxidant selected from the group consisting of antioxidants having at least one functional group selected from amine functional groups, phenol functional groups, and quinoline functional groups,
   wherein the base oil has a kinetic viscosity of 70 to 400 mm²/s at 40° C.,
   wherein the thickener (a) is contained in an amount of 3 to 20 mass % based on the total mass of the grease composition,
   wherein the molybdenum dialkyldithiocarbamate (c) is contained in an amount of 1 to 5 mass % based on the total mass of the composition, and
   wherein the calcium sulfonate (d) is contained in an amount of 1 to 5 mass % based on the total mass of the composition.

2. The grease composition for the hub unit bearing employing an angular contact ball bearing of claim 1, further comprising a zinc dialkyldithiophosphate in an amount of 0.1 to 3.0 mass % based on the total mass of the composition.

3. The grease composition for the hub unit bearing employing an angular contact ball bearing of claim 1, wherein the base oil is a mineral oil.

4. The grease composition for the hub unit bearing employing an angular contact ball bearing of claim 1, wherein the base oil is a mixture of a mineral oil and a synthetic hydrocarbon oil having 50 mass % or more of a mineral oil based on the total mass of the base oil.

5. The grease composition for the hub unit bearing employing an angular contact ball bearing of claim 1, wherein the antioxidant is selected from the group consisting of phenyl α-naphthylamine, alkylated phenyl α-naphthylamine, and alkylated diphenylamine.

6. The grease composition for the hub unit bearing employing an angular contact ball bearing of claim 1, wherein the antioxidant is selected from the group consisting of 2,6-di-tert-butyl-p-cresol, pentaerythrityl tetrakis[3-(3,5-di-t-butyl-4-hydroxyphenyl)propionate], and octadecyl-3-(3,5-di-t-butyl-4-hydroxyphenyl)propionate.

7. The grease composition for the hub unit bearing employing an angular contact ball bearing of claim 1, wherein the antioxidant is 2,2,4-trimethyl-1,2-dihydroquinoline polymer.

* * * * *